United States Patent [19]

Hajnal

[11] 4,437,745
[45] Mar. 20, 1984

[54] THREE DIMENSIONAL CAMERA SYSTEM

[76] Inventor: Stephen Hajnal, 5600 Riverdale Ave., Bronx, N.Y. 10471

[21] Appl. No.: 432,029

[22] Filed: Sep. 30, 1982

[51] Int. Cl.³ ............................................. G03B 35/10
[52] U.S. Cl. ..................................... 354/117; 350/130; 350/423; 352/65; 358/88
[58] Field of Search ....................... 352/60, 65; 354/115, 354/117, 112; 358/88, 225, 226, 227; 350/130, 423

[56] References Cited

U.S. PATENT DOCUMENTS

| | | | |
|---|---|---|---|
| 2,314,174 | 3/1943 | Steinman | 354/112 |
| 2,736,250 | 2/1956 | Papritz | 354/117 |
| 3,784,738 | 1/1974 | Natter | 358/88 X |

Primary Examiner—John Gonzales
Attorney, Agent, or Firm—Jacobs & Jacobs

[57] ABSTRACT

A stereo optics apparatus, comprising a zoom lens attachable to a camera body and having an operating element operable when moved in first and second directions to increase or decrease the focal length of said zoom lens, first and second spaced apart movable reflectors facing said zoom lens on either side of and transverse to the optical axis of said zoom lens, said first and second reflectors being movable to change the acute angle included therebetween, third and fourth reflectors facing said first and second reflectors, respectively, and said zoom lens, said reflectors being operable to divide the light entering said zoom lens into two separate beams, a first electrical motor for operating said operating element of said zoom lens, a second electrical motor for moving said first and second reflectors, said motors being operated in synchronism such that said included angle is increased or decreased by said second motor as said focal length is decreased or increased, respectively, by said first motor.

8 Claims, 4 Drawing Figures

THREE DIMENSIONAL CAMERA SYSTEM

The present invention relates to stereo optics for attachment to a camera.

Cameras and projectors for stereo pictures are well known. In such devices, a camera is employed having a lens system whereby two images of the same scene are recorded on a frame of film in side-by-side relationship. This is accomplished by using either two separate cameras or optics ganged together to deliver side-by-side images to the frame or film, or a single lens having a beam-splitter or other similar mechanism for delivering the two images to the film.

As is known, when the two side-by-side images are projected on a screen, and the images are superimposed, the viewer will obtain a three-dimensional effect if the two images are appropriately encoded at the time that they are projected and decoded at the time they are viewed. For example, if the left-hand image being projected is polarized in one direction and the right-hand image of the same scene is polarized in a direction perpendicular thereto, then the viewer will see a three dimensional effect by viewing the encoded image through glasses in which the right-hand and left-hand lenses are polarized in the same direction as the right-hand and left-hand images, respectively.

A significant problem in taking three-dimensional motion pictures, employing either photographic film or video tape, is that the camera lens that is used has only a single focal length. Because of the importance of recording the split images in proper relationship on the film, it is customary to fix the position of the stereo camera with respect to the scene being taken. If close-ups are required, it is then necessary to physically move the camera closer to the subject, and then to return the camera back to its original location after the closeups have been taken. While time-consuming in and of itself, this back-and-forth movement also increases the manipulative steps necessary to insure that the images are being properly recorded.

The use of a fixed focal length lens also makes difficult the recording of action scenes in which an object rapidly moves towards the camera.

There is thus a need in the art for a three-dimensional camera system that will enable the camera to remain at a fixed location and yet permit the taking of closeups.

There is also a need in the art for a three-dimensional camera system that will permit the camera to remain in a fixed position and yet enable the taking of action scenes in which the action moves towards the camera.

The present invention now provides a three-dimensional camera system, comprising a motorized zoom lens operable to change from one focal length thereof to another through a predetermined range of focal lengths, first and second movable reflectors spaced on either side of and transverse to the optical axis of the zoom lens and facing away from the zoom lens; third and fourth reflectors facing the first and second reflectors, respectively, and the zoom lens; the reflectors being operable to divide the light entering the zoom lens into two separate beams; first electrical motor means for operating the zoom lens; second electrical motor means for moving the first and second movable reflectors; the motors being synchronized so that the second motor changes the acute angle included by the first and second reflectors inversely as the first motor operates to change the focal length of the zoom lens. In particular, the motors are synchronously operated to decrease the included angle as the zoom lens is zoomed to a larger focal length and to increase the included angle as the zoom lens is zoomed to a smaller focal length.

The present invention is illustrated in terms of a preferred embodiment in the accompanying drawings, in which.

Figure 1:
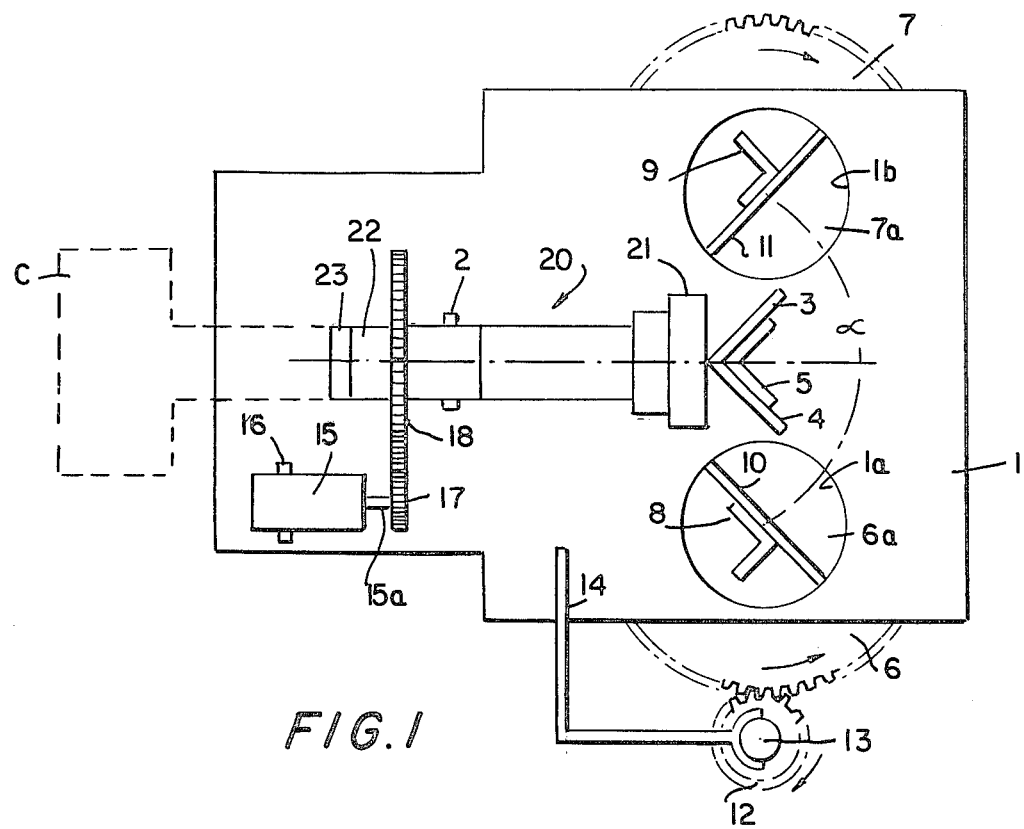
FIG. 1 is a top plan view of the apparatus according to the invention.
Figure 2:
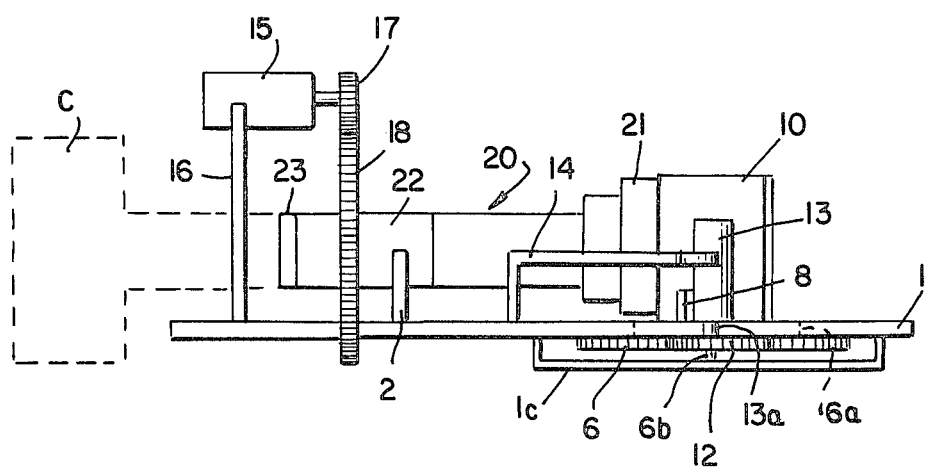
FIG. 2 is a side elevational view of the apparatus according to the invention.

Referring to the drawings, and particularly FIGS. 1 and 2, the stereo camera system according to the invention includes a support 1 made of any suitable material, such as metal, which carries a cradle 2 that is rigidly connected to and supports a motorized zoom lens 20. Mirrors 3 and 4 are attached to an L-shaped support 5, which is in turn, fixedly mounted on support 1. Mirrors 3 and 4 are arranged at an angle of 45° with respect to the optical axis of the zoom lens 10.

Underneath the support 1 are a pair of meshing gears 6 and 7, having integral hubs 6a and 7a, respectively, which fit into apertures 1a and 1b, respectively, formed in the support 1. Shaft 6b (FIG. 2) of gear 6 is supported from below the support 1 by means of the U-shaped support member 1c (FIG. 2), as is the shaft (not shown) of gear 7. Shaft 6b of gear 6 rests on the U-shaped member 1c, but if desired, suitable bearings can be provided for the shafts of gears 6 and 7.

Hubs 6a and 7a carry L-shaped supports 8 and 9, respectively, on which is rigidly mounted mirrors 10 and 11, respectively. As thus described, rotation of gear 6 in the direction shown by the arrow causes gear 7 to rotate in the opposite direction, and using the arrows shown in FIG. 1 for orientation, rotation of the gears 6 and 7 in the direction of the arrows will cause the mirrors 10 and 11 to move toward each other as viewed in FIG. 1, which will decrease the angle α included between mirrors 10 and 11.

The gears 6 and 7 are caused to rotate by means of gear 12, which meshes with gear 6. Gear 12 is connected to the shaft 13a of motor 13, which is in turn, carried by a support 14 mounted on support 1.

The motorized zoom lens 20 has an operating element 22 which causes the lens to zoom to a larger focal length when the operating element 22 is rotated in one direction about the optical axis of the zoom lens 20, and to a smaller focal length when rotated in the opposite direction. Zoom lens 20 is a conventional motorized zoom lens, which has all of its movable optics within the interior of the zoom lens and is so constructed such that the front 21 of the zoom lens 20 does not move with respect to the rear 23 as the focal length is changed.

Adjacent zoom lens 20 is motor 15, which is carried by support 16 mounted on the support 1. The shaft 15a of motor 15 carries a gear 17 which meshes with gear 18 that is rigidly connected to the operating element 22 of the zoom lens 20.

The rear 23 of the zoom lens 20 has conventional attaching means for securing the zoom lens 20 to a camera body C, which is shown in dotted line in FIGS. 1 and 2. Camera body C may be the body of a still, motion picture or video camera of any format. Usually camera body C will be the body of a 16 mm or 35 mm motion picture camera or video camera.

Figure 3:
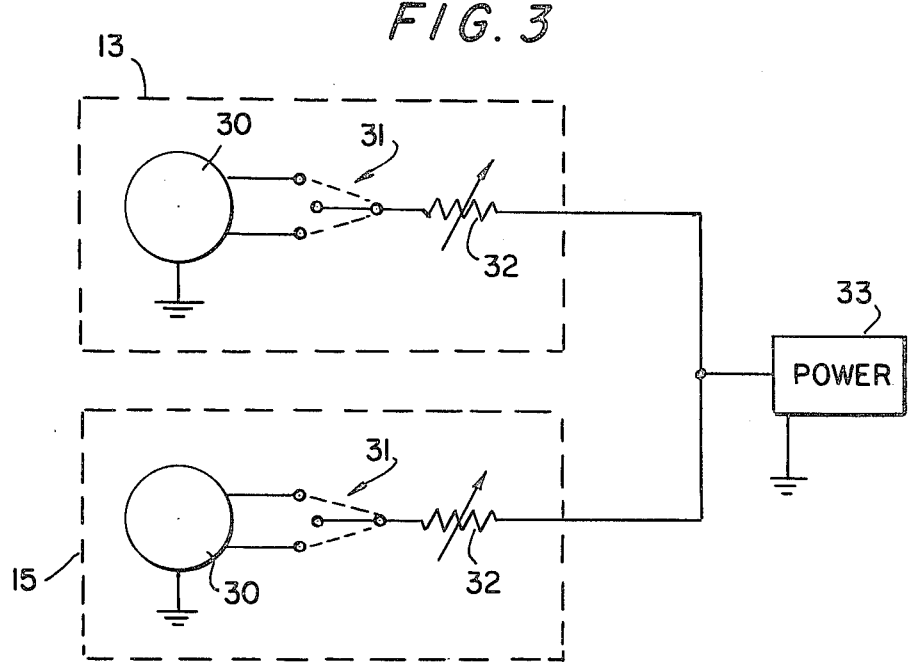
FIG. 3 is a block diagram of the electrical circuitry used in the invention.

Motors 13 and 15 are commercially available, reversible DC motors that may be electrically connected as shown in FIG. 3. Each of the motors 13 and 15 has a self-contained armature 30, a three-way reversing switch 31 and a rheostat 32. Each of the motors 13 and 15 is grounded and connected to a grounded DC power source 33. When the switch 31 is in a neutral position shown in FIG. 3, the motors 13 and 15 are in the OFF position. As is known, switch 31 changes the polarity of the motors 13 or 15. Thus, when the switch 31 of each of the motors 13, 15 is moved to the upper position, as viewed in FIG. 3, the motors 13, 15 turn in one direction, and when the switch 31 of motors 13, 15 is thrown to the lowermost position, as viewed in FIG. 3, the motors 13, 15 turn in the opposite direction. The rheostat 32 controls the speed of the motor 13, 15 and before use, the rheostat 32 will be adjusted so that the zooming of the zoom lens 20 is synchronized with the speed of rotation of gears 6, 7.

Figure 4:
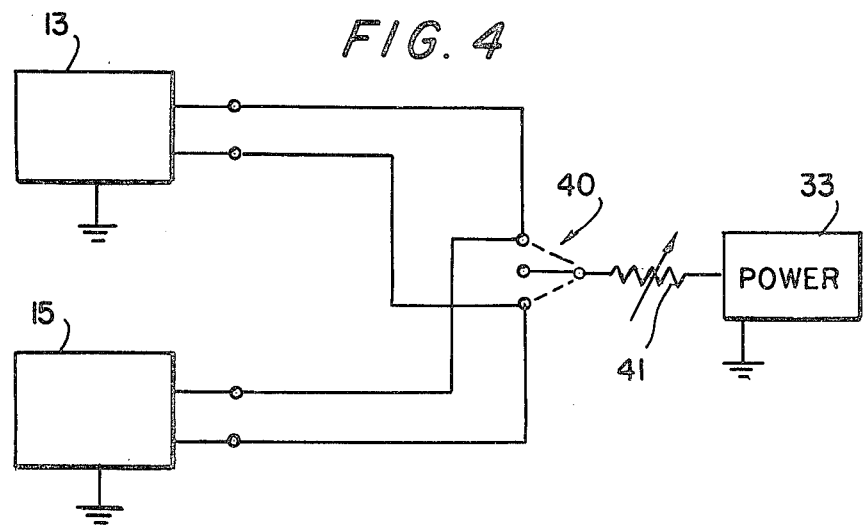
FIG. 4 is a block diagram of an alternative electrical circuit used in the invention.

FIG. 4 illustrates an alternative embodiment of the invention in which an external, three-way switch 40, and an external rheostat 41 replace the self-contained switch 31 and rheostat 32 of the motors 13, 15. Three-way switch 40 and rheostat 41 are in series with the power source 33, and the terminals of the switch 40 are wired directly into the appropriate terminals of the motors 13, 15. Moving the switch 40 to the uppermost terminal, causes the motor 13, 15 to turn in one direction and moving the switch 40 to the lowermost terminal causes the motors 13, 15 to turn in the opposite direction.

The operation of the invention is as follows. First, the zoom lens 20 is secured in the position where the front element 21 is closely adjacent mirrors 3, 4; preferably the front element 21 is just out of contact with the mirrors 3, 4. Next, camera C is attached to the zoom lens 20 and the zoom lens 20 is set at a desired focal length, usually the smallest focal length. In a preferred embodiment, a commercially available, motorized 16 mm format motion picture zoom lens having a range of focal lengths of from 12 mm to 120 mm will be used, and hence the zoom lens 20 is preferably set at 12 mm. The zoom lens 20 is then focused on an object at a distance from camera C, after which it is zoomed to its 120 mm focal length by manually rotating gear 18. The two images viewed through the view-finder of camera C will be slightly out of focus. These images are aligned by manually rotating gears 6.7 in the direction shown by the arrows to move the mirrors 10, 11 inwardly.

It can be seen that the included angle α corresponding to the smallest focal length is pre-set at substantially 90°, and that the adjustment procedure described above establishes the included angle α corresponding to the largest focal length of the zoom lens 20. This, in turn, establishes the degree of rotation of gears 6, 7 necessary to change the included angle α as the focal length changes between 12 mm to 120 mm. Rheostat 32 of motors 13, 15 is then adjusted to synchronize motors 13, 15 so that motor 13 decreases the included angle α from its predetermined value at the 12 mm focal length to the predetermined value at the 120 mm focal length as motor 15 zooms the zoom lens 20 to increase the focal length from 12 mm to 120 mm. When motors 13, 15 are reversed, the included angle α will increase as the focal length decreases.

With all of the preliminary adjustments now completed, the camera system is ready for shooting. In use, the zoom lens 20 will deliver to each frame of film, a pair of side-by-side images of the same scene. These images will be in proper focus and alignment over the entire range of focal length of the zoom lens 20. The operator can thus keep the apparatus at a fixed position and can use the zoom lens 20 to take close-ups or to record in focus objects approaching the camera. After development, the side-by-side images recorded on the film may be played back through conventional stereo projection equipment.

What is claimed:

1. A stereo optics apparatus, comprising
   (a) a zoom lens attachable to a camera body and having an operating element operable when moved in first and second directions to increase or decrease the focal length of said zoom lens;
   (b) first and second spaced apart movable reflectors facing said zoom lens on either side of and transverse to the optical axis of said zoom lens, said first and second reflectors being movable to change the acute angle included therebetween;
   (c) third and fourth reflectors facing said first and second reflectors, respectively, and said zoom lens;
   (d) said reflectors being operable to divide the light entering said zoom lens into two separate beams;
   (e) first electrical motor means for operating said operating element of said zoom lens;
   (f) second electrical motor means for moving said first and second reflectors;
   (g) said motors being operated in synchronism such that said included angle is increased or decreased by said second motor means as said focal length is decreased or increased, respectively, by said first motor means.

2. The apparatus according to claim 1, wherein said third and fourth reflectors are each at an angle of substantially 45° with said optical axis and said included angle is substantially 90° when said zoom lens is at a predetermined focal length.

3. The apparatus according to claim 2, wherein said predetermined focal length is the smallest focal length of said zoom lens.

4. The apparatus according to claim 3, wherein said zoom lens has a first gear means operatively connected to said operating element, said first electrical motor means includes a first reversible electrical motor and second gear means operatively connected to said first electrical motor and engaging said first gear means, said first and second reflectors are mounted on third and fourth engaging gear means, respectively, and said second electrical motor means includes a second electrical motor and fifth gear means operatively connected to said second electrical motor and engaging one of said third and fourth gear means.

5. The apparatus according to claim 4, wherein said reflectors are symetrically disposed with respect to said optical axis.

6. The apparatus according to claim 5, wherein said third and fourth reflectors each have an edge thereof substantially on said optical axis and closely adjacent said zoom lens, said edges being in contact with one another.

7. The apparatus according to claim 6, wherein said zoom lens is operatively connected to a camera body.

8. The apparatus according to claim 7, wherein said camera body is a body of a motion picture or video camera.

* * * * *